Figure 1:
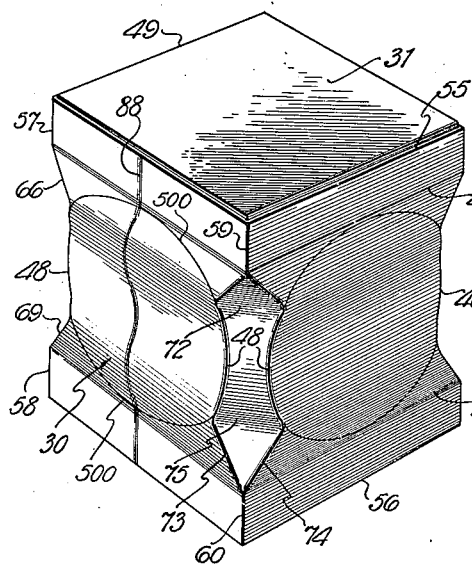

Aug. 11, 1936.                R. E. PAIGE                2,050,894
                            FOLDED BLANK BOX
                          Filed May 29, 1934            6 Sheets-Sheet 1

WITNESS:

INVENTOR
RICHARD E. PAIGE.
BY
Ely Pattison.
ATTORNEYS

Aug. 11, 1936.  R. E. PAIGE  2,050,894
FOLDED BLANK BOX
Filed May 29, 1934  6 Sheets-Sheet 2
FIG. 6.
FIG. 5.
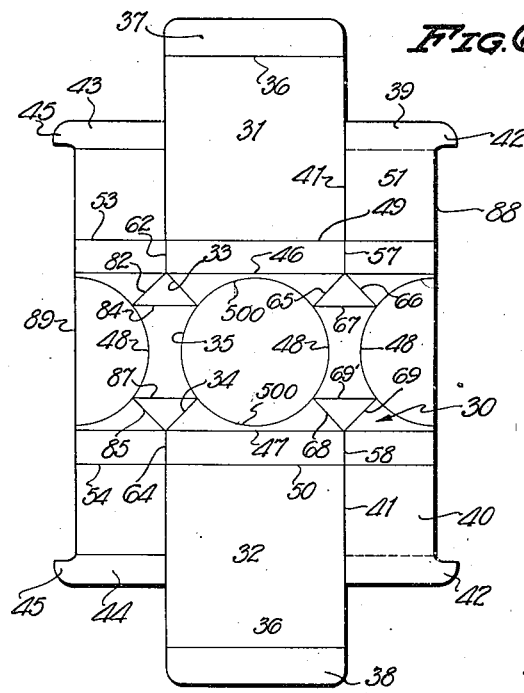
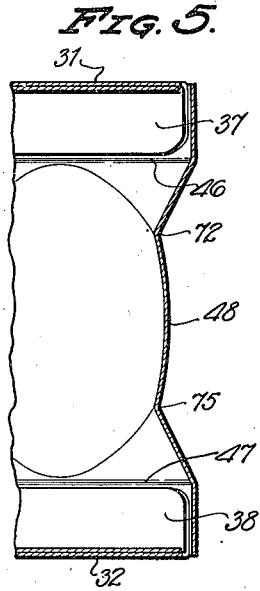
FIG. 7.
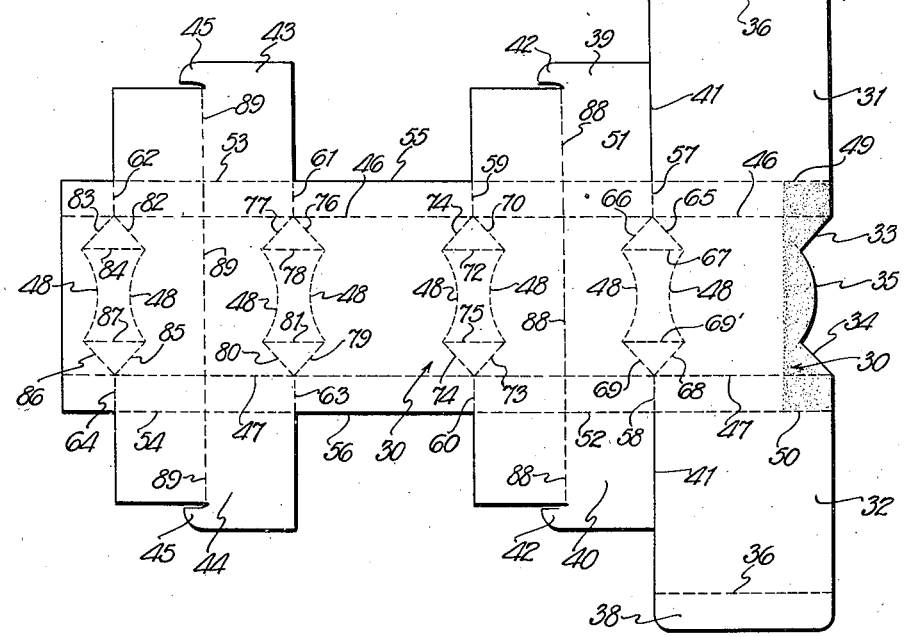
INVENTOR
RICHARD E. PAIGE.
BY
Ely Pattison
ATTORNEYS
WITNESS:

Aug. 11, 1936.         R. E. PAIGE         2,050,894
FOLDED BLANK BOX
Filed May 29, 1934         6 Sheets-Sheet 3
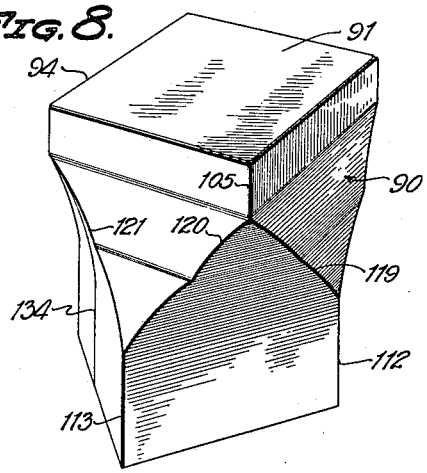
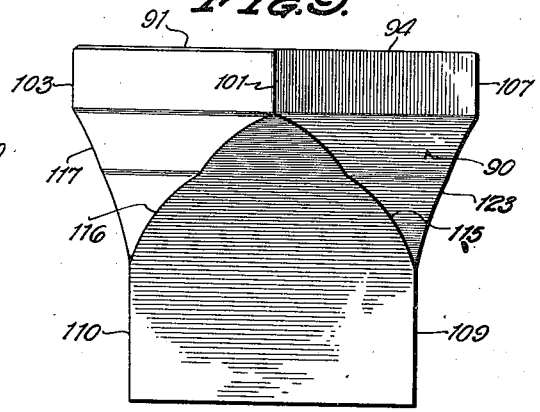
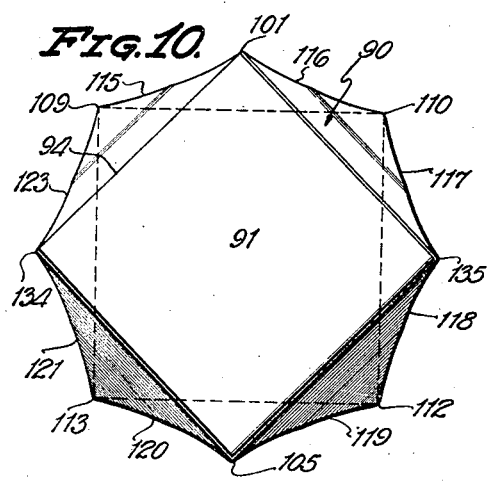
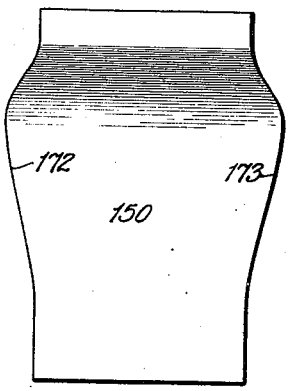
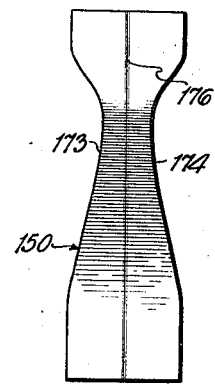
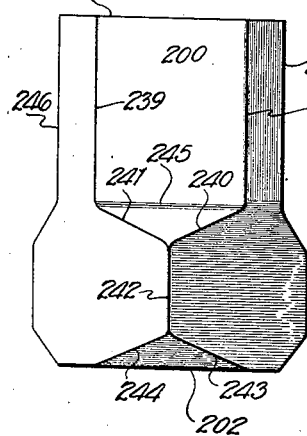
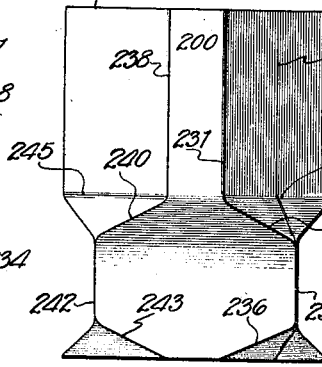
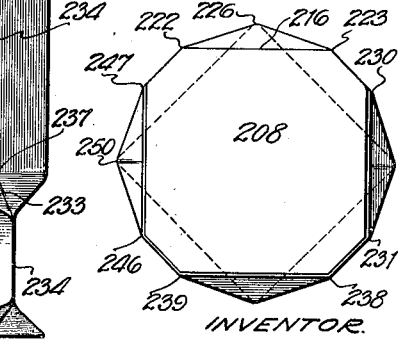
INVENTOR.
RICHARD E. PAIGE.
BY
Ely & Pattison
ATTORNEYS Aug. 11, 1936.     R. E. PAIGE     2,050,894
FOLDED BLANK BOX
Filed May 29, 1934     6 Sheets-Sheet 4

INVENTOR
RICHARD E. PAIGE.
BY
Ely Pattison
ATTORNEYS

WITNESS:

Aug. 11, 1936.    R. E. PAIGE    2,050,894
FOLDED BLANK BOX
Filed May 29, 1934    6 Sheets-Sheet 5
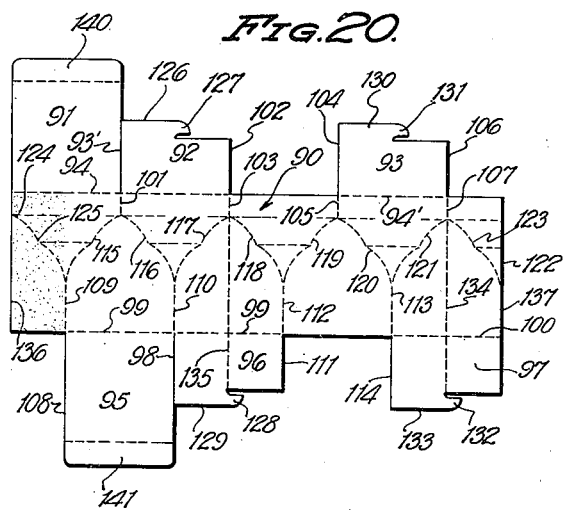
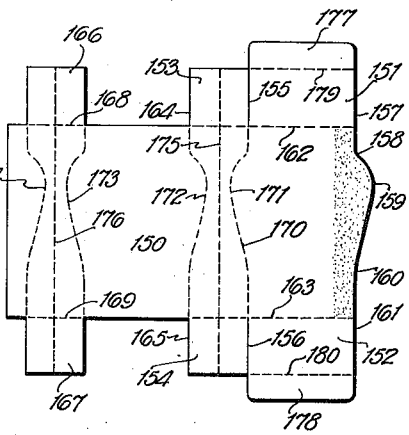
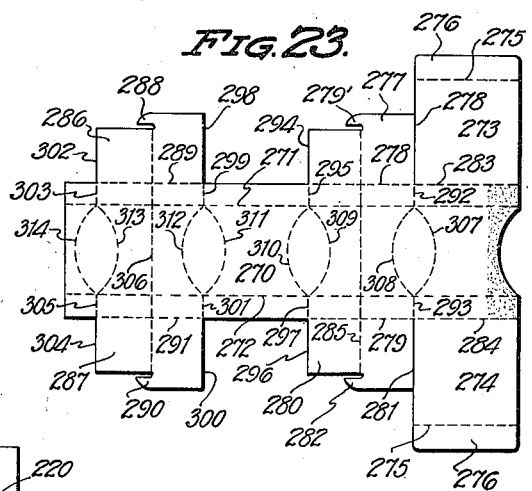
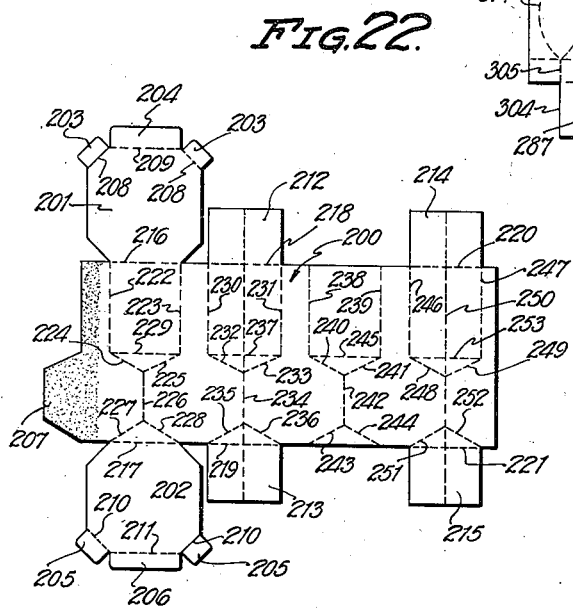
INVENTOR
RICHARD E. PAIGE.
BY
Ely & Pattison
ATTORNEYS
WITNESS:

Aug. 11, 1936.   R. E. PAIGE   2,050,894
FOLDED BLANK BOX
Filed May 29, 1934   6 Sheets-Sheet 6
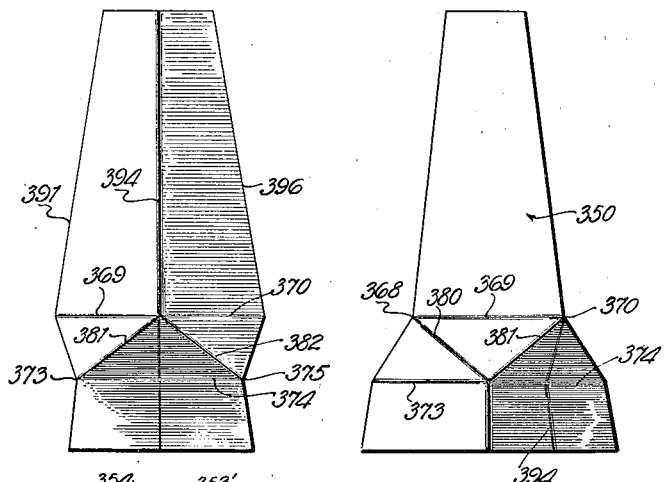
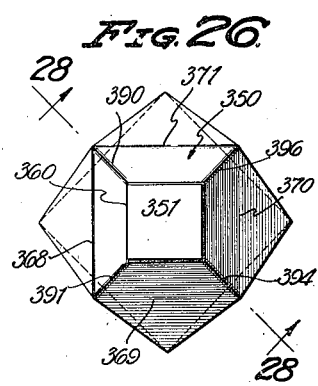
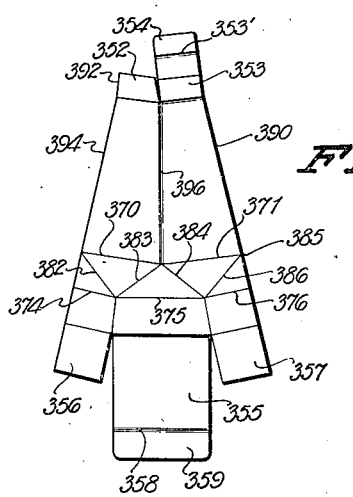
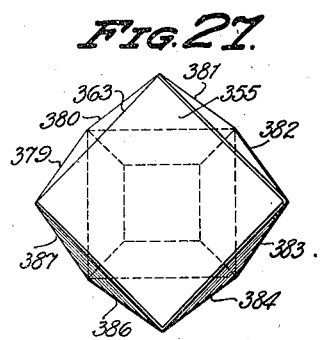
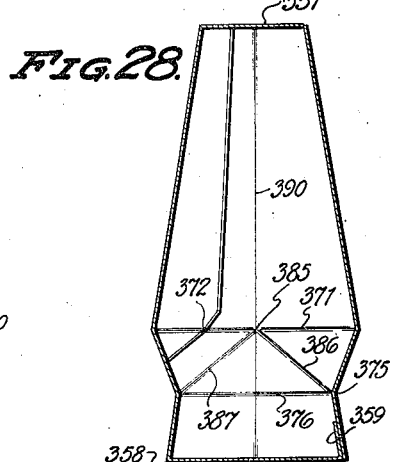
INVENTOR
RICHARD E. PAIGE.
BY
Ely & Pattison
ATTORNEYS
WITNESS:

Patented Aug. 11, 1936

2,050,894

UNITED STATES PATENT OFFICE 2,050,894

FOLDED BLANK BOX

Richard Eaton Paige, Flushing, N. Y.

Application May 29, 1934, Serial No. 728,054

4 Claims. (Cl. 229—16)

This invention relates to new and useful improvements in methods of manipulating flexible material such as paper, cardboard and similar materials capable of being bent or folded along scored or creased lines to produce articles of predetermined shapes or contours.

While the present invention is capable of many useful embodiments, it particularly lends itself to the manufacture of folded blank boxes, cartons, and display forms and renders possible the manufacture of such devices in odd and unusual shapes heretofore unobtainable.

I am aware that folded blank boxes are quite common and that many patents have been granted thereon. All such devices with which I am familiar, however, are formed by scoring blanks of material along lines which are straight. It is at present generally considered impractical, if not impossible in the box making art, to score or crease and fold or bend materials such as paper, box board, cardboard and the like along irregular lines because of cracking and the rupture or breaking of the material which invariably results at the point of irregularity of the score.

I have, as a result of many experiments, found that if certain principles are adhered to, material can be scored or creased along irregular lines and folded or flexed along such lines without cracking, breaking or otherwise damaging the material so manipulated.

When material such as cardboard, box board, or the like is flexed or folded along irregular lines, it has an inherent tendency to either break or buckle and distort into unsightly shapes or forms which cannot be put to any utilitarian purpose. I have found, however, that scoring or creasing the material in such a manner that buckling or distortion at one location is compensated for by a corresponding buckling or distortion at another location, the material between said irregular score lines is held in a flexed position corresponding in contour to the scores themselves, with no undue strain or rupture.

It will, therefore, be apparent that the present invention utilizes to advantage what has heretofore been considered a serious drawback or detriment in the flexing of cardboard, box board and similar materials along irregular lines and renders what has heretofore been considered impossible of accomplishment and therefore of no value, not only possible and practical, but of great value, particularly in the art of folded blank boxes.

I am aware that boxes have been heretofore constructed in various ornamental shapes and of irregular contour, but all such devices with which I am familiar are formed by providing pleats, gussets, take in sections, or by hot pressing, molding or building up by gluing together variously formed pieces of material. However, such devices differ from those of the present invention in that they are not formed by folding a blank, nor are they capable of being collapsed.

The invention will be better understood by reference to the following specification considered in connection with the accompanying drawings wherein I have illustrated several forms or types of folded blank boxes formed or constructed in accordance with the teachings of the present invention.

Figure 2:
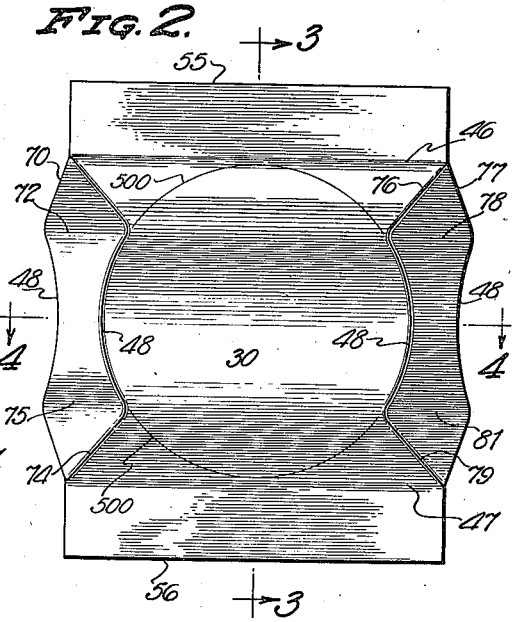
Figure 3:
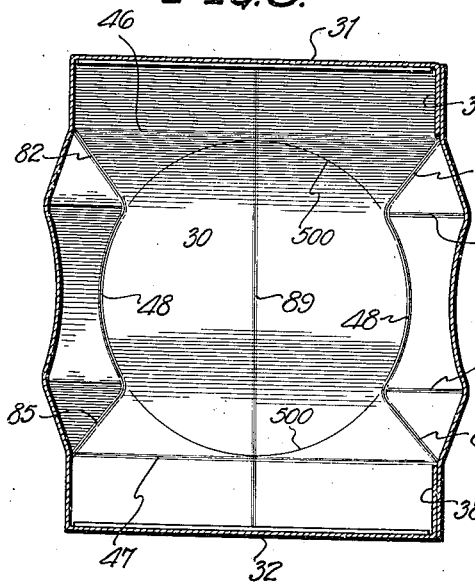
Figure 4:
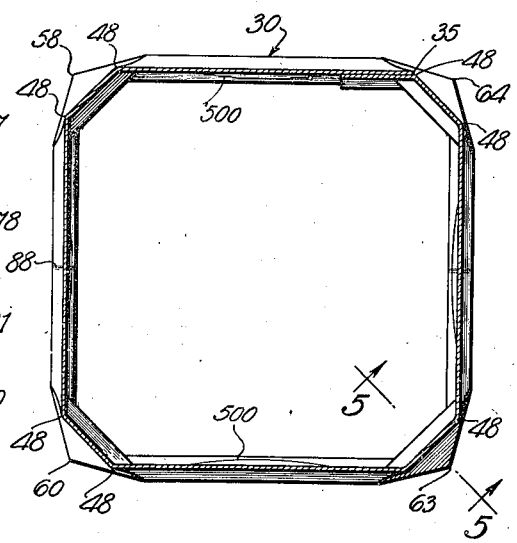
Figure 16:
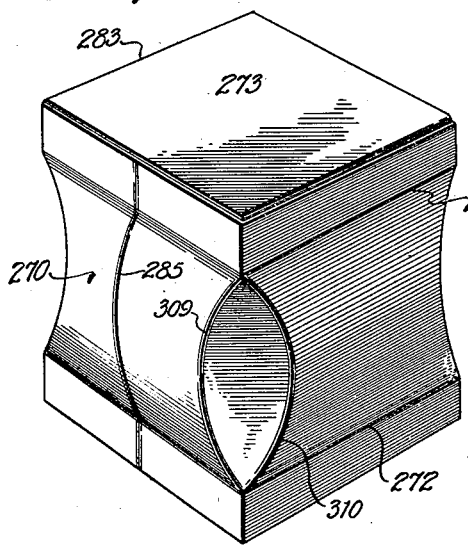
Figure 17:
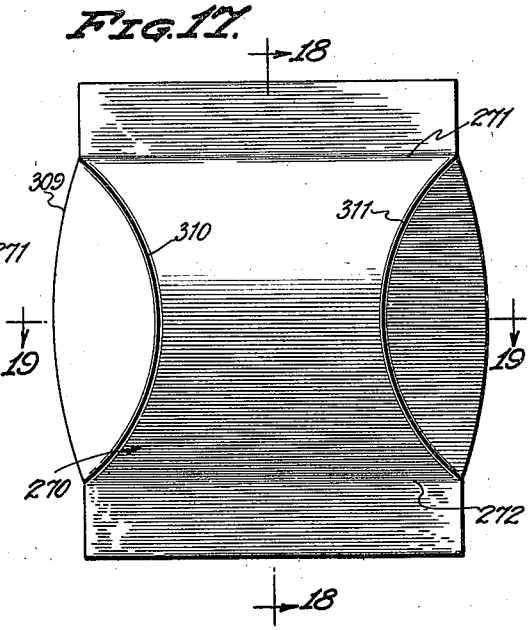
Figure 18:
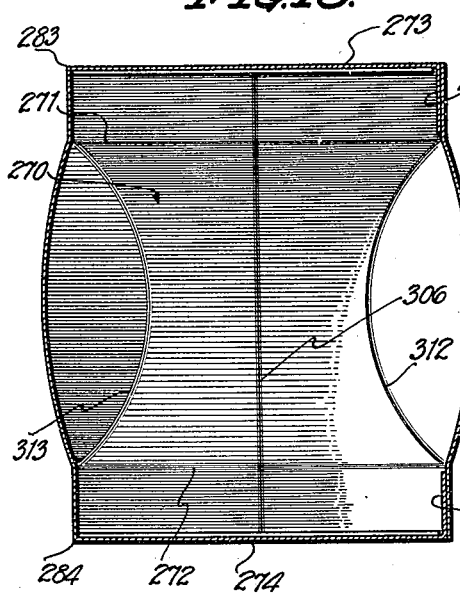
Figure 19:
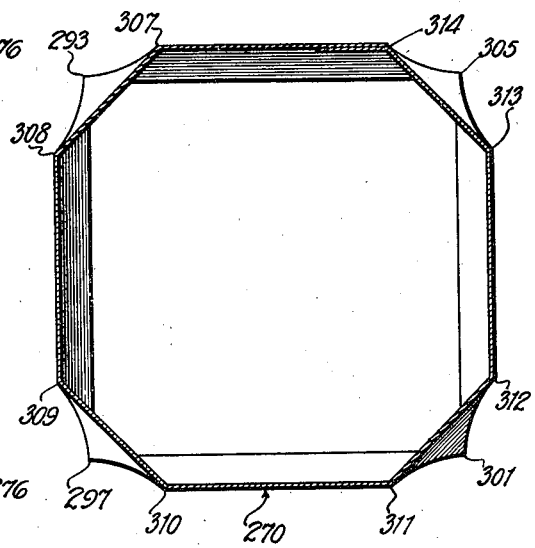

In the drawings,

Figure 1 is a perspective view illustrating one form of folded blank box constructed in accordance with this invention, Figure 2 is a view in elevation of the box illustrated in Figure 1, Figure 3 is a vertical sectional view taken on the line 3—3 of Figure 2, Figure 4 is a horizontal sectional view taken on the line 4—4 of Figure 2, Figure 5 is a fragmentary sectional view taken on the line 5—5 of Figure 4, Figure 6 is a plan view illustrating the box shown in Figures 1 to 5, inclusive, in its collapsed condition, Figure 7 is a plan view illustrating the blank from which the box shown in Figures 1 to 6, inclusive, is formed, Figure 8 is a perspective view illustrating another type of box, Figure 9 is a view in elevation of the box illustrated in Figure 8, Figure 10 is a top plan view of the box illustrated in Figures 8 and 9, Figure 11 is a view in side elevation of still another type of box, Figure 12 is a view in elevation taken at right angles to Figure 11, Figure 13 is a view in elevation illustrating still another type of box, Figure 14 is a view similar to Figure 13, the box being turned substantially forty-five (45°) degrees, Figure 15 is a top plan view of that form of box illustrated in Figures 13 and 14, Figure 16 is a perspective view illustrating still another type of box, Figure 17 is a view in side elevation of the box illustrated in Figure 16, Figure 18 is a vertical sectional view taken substantially on the line 18—18 of Figure 17, Figure 19 is a horizontal sectional view taken substantially on the line 19—19 of Figure 17, Figure 20 is a plan view illustrating the blank from which the box illustrated in Figures 8, 9, and 10 is formed, Figure 21 is a plan view illustrating the blank from which the box illustrated in Figures 11 and 12, is formed, Figure 22 is a plan view illustrating the blank from which the box illustrated in Figures 13, 14, and 15, is formed, Figure 23 is a plan view illustrating the blank from which the box illustrated in Figures 16 to 19, inclusive, is formed, Figure 24 is a view in side elevation of a still further modified form of the invention, Figure 25 is a view similar to Figure 24, the box being turned substantially forty-five (45°) degrees, Figure 26 is a top plan view of that form of the invention illustrated in Figures 24 and 25, Figure 27 is a bottom plan view of that form of the invention illustrated in Figures 24 and 25, Figure 28 is a vertical sectional view taken substantially on the line 28—28 of Figure 26, Figure 29 is a plan view of the box illustrated in Figures 24 to 27, in collapsed condition, and;

Figure 30 is a plan view of the blank from which the box illustrated in Figures 24 to 27, is formed.

Referring to the drawings, and particularly to Figures 1 to 7, inclusive, the container or box illustrated is of general rectangular form. It is formed from a blank such as illustrated in Figure 7, the blank being scored in a manner to be hereinafter described, the scored lines determining the lines of fold of the blank to form the box shown. In the following description I will refer to those lines upon which the several blanks are flexed or folded as score lines but it is to be understood that I am not to be limited to scoring and that any known method of weakening the material to form definite lines of flexing or folding may be employed without departing from the spirit of the invention.

The blank illustrated in Figure 7 is of general rectangular shape, and consists of an elongated main body portion 30. Projecting laterally from opposite sides of the blank at one end thereof, there are two relatively large sections 31 and 32, and the end upon which these sections are formed, is shaped to provide two angular edges 33 and 34, which are connected by a curved edge 35. The sections 31 and 32 are scored along the lines designated 36 to provide end sections 37 and 38, respectively.

Closely adjacent the sections 31 and 32, there are two section 39 and 40, each of which is separated from its respective section 31 or 32, by cutting the blank along the lines designated 41. Each of these sections is formed on its outer edge with a tongue-like projection 42, the purpose of which will be hereinafter described.

Adjacent the opposite end of the blank there are two laterally projecting sections 43 and 44, and each of these sections is formed on its outer edge with a tongue 45 similar to the tongues 43, heretofore mentioned.

The main body portion of the blank is scored throughout its length along two parallel lines designated 46 and 47, and within the confines of these score lines 46 and 47, the blank is scored along curved or arcuate lines 48 which extend transversely of the main body portion of the blank. The extensions 31 and 32 are scored respectively along the lines designated 49 and 50, which lines extend parallel with and are spaced from the score lines 46 and 47, respectively.

The extensions 39 and 40 are scored along the lines designated 51 and 52, which score lines are parallel with but spaced respectively from the score lines 46 and 47. The extensions 43 and 44 are scored respectively along the lines designated 53 and 54, which score lines extend parallel with the score lines 46 and 47, and in spaced relation therewith.

It will be noted that each of the score lines 49, 51 and 53 are in line with, or continuations of the side edge 55 of the blank, and that the score lines 50, 52, and 54 are in line with, or continuations of the side edge 56 of the blank.

The main body of the blank is scored transversely between the score lines 46 and 49, and in line with the adjacent side edges of the extensions 31 and 39, as at 57. The blank is also scored transversely between the score lines 47 and 50 and in line with the adjacent edges of the extensions 32 and 40, as at 58. The blank is also scored transversely between the score lines 46 and 51, as at 59, and between the score lines 47 and 50, as at 60. The blank is also scored transversely between the score lines 46 and 49, as at 61 and 62, and between the score lines 47 and 52, as at 63 and 64.

Diverging score lines 65 and 66 extend from the inner end of the score line 57, and terminate where they join the adjacent curved or arcuate score lines 48, and these score lines 65 and 66 are connected at their inner ends by a score line 67. Diverging from the inner end of the score line 58, there are two score lines 68 and 69, and these score lines 68 and 69 terminate where they join with the adjacent curved or arcuate score lines 48, and their inner ends are connected by a score line 69'. Diverging from the inner end of the score line 59 and terminating where they join the adjacent curved or arcuate score lines 48, there are two score lines 70 and 71, the inner ends of which are connected by a score line 72. Extending in diverging relation from the inner end of the score line 60 and terminating where they join with the adjacent curved or arcuate score lines 48, there are two score lines 73 and 74, and their inner ends are connected by a score line 75. Extending from the inner end of the score line 62 and extending to the point where they meet the adjacent curved or arcuate score lines 48, there are two score lines 76 and 77, the inner ends of which are connected by a score line 78, and extending from the inner end of the score line 63 and terminating where they join the adjacent curved or arcuate score lines 48, there are two score lines 79 and 80, the inner ends of which are connected by a score line 81. Extending in diverging relation from the inner end of the score line 62 there are two score lines 82 and 83, which terminate at the point where they join the adjacent curved or arcuate score lines 48, and their inner ends are connected by a score line 84. Extending in diverging relation from the inner end of the score line 64, there are two score lines 85 and 86 which terminate at the point where they join the adjacent arcuate lines 48, and the inner ends of these score lines 85 and 86 are connected by a score line 87.

Extending transversely of the blank and throughout the extensions 39 and 40, there is a score line 88, and extending transversely of the blank and throughout the extensions 43 and 44, there is a score line 89.

I will now describe the manner in which the blank illustrated in Figure 7 is folded to form the container or box illustrated in Figures 1 to 6, inclusive.

Assuming that the exposed face of the blank, as illustrated in Figure 7, is that face which forms the inside of the container or box when folded, the score lines being formed upon this face of the blank, which score lines, it will be understood, will be of sufficient size and depth, depending upon the weight stock employed, to permit flexing upon the score lines without rupture of the stock.

The extensions 43 and 44 are folded upon the score line 89, the portion to the left of said score line 89 in Figure 7 being folded over to the right upon the main body of the blank. The blank is next folded upon the score line 88, that portion of the blank which lies upon the right of the score line 88 in Figure 7 being folded over upon the main body portion of the blank.

With the parts in this position, the edge 35 coincides with the scored line 48 at the extreme left end of the blank in Figure 7, the edge 33 coincides with the score line 83 and the edge 34 coincides with the score line 86. With the blank thus folded, the overlapped ends are secured together by a suitable adhesive. After the adhesive sets, the blank is grasped and by application of pressure to the sides thereof, is forced into a position which is somewhat cylindrical in form. The ends of the box are next formed by flexing the extensions 39, 40, 43, and 44, inwardly upon the respective score lines 51, 52, 53, and 54, their respective tongues 42 and 45 being interlocked to hold the extensions in their infolded position.

The extension 31 forms one cover, the extension 32 forming the other cover, and these covers are next folded or flexed upon their respective score lines 49 and 50, their end sections 37 and 38, respectively, being folded or flexed upon the score lines 36 and tucked inwardly of the box.

With the box set up as thus far described, pressure applied to the side walls thereof will cause flexing of the same along the several score lines described, and the folded blank will assume the shape or form illustrated in Figures 1 to 5, inclusive.

The blank from which the container or box illustrated in Figures 8 to 10, inclusive, is formed is illustrated in Figure 20, and I will now proceed to describe this blank and the manner in which the container or box is formed therefrom.

The main body portion of this blank is designated 90. This blank is provided upon one of its side edges with extensions 91, 92, and 93, the extensions 91 and 92 being separated from each other by a line of cut 93', the inner edges of the two extensions 91 and 92 being defined by a score line 94, and the inner edge of the extension 93 is defined by a score line 94'.

Upon the opposite side edge of the blank, there are three extensions 95, 96, and 97, the extensions 95 and 96 being separated from each other by a line of cut 98. The inner edges of the extensions 95 and 96 are defined by a score line 99, the inner edge of the extension 97 is defined by a score line 100.

Extending inwardly of the blank in line with the line of cut 93, there is a relatively short score line 101 and similarly, extending inwardly of the blank in line with the side edge 102 of the extension 92, there is a relatively short score line 103. Extending inwardly of the blank in line with the side edge 104 of the extension 93, there is a relatively short score line 105, and extending inwardly of the blank in line with the side edge 106 of the extension 93, there is a relatively short score line 107.

Extending inwardly of the blank in line with the side edge 108 of the extension 95, there is a score line 109. Extending inwardly of the blank in line with the line of cut 98, there is a score line 110, and extending inwardly of the blank in line with the side edge 111 of the extension 96, there is a score line 112. A score line 113 extends inwardly of the blank in line with the side edge 114 of the extension 97.

Connecting the inner end of the score line 109, with the inner end of the score line 101, there is an irregular score line 115, and connecting the inner end of the score line 110, with the inner end of the score line 101, there is an irregular score line 116. Connecting the inner end of the score line 110 with the inner end of the score line 103, there is an irregular score line 117 and connecting the inner end of the score line 112 with the inner end of the score line 103, there is an irregular score line 118. Connecting the inner end of the score line 112 with the inner end of the score line 105, there is an irregular score line 119, and connecting the inner end of the score line 113 with the inner end of the score line 105, there is an irregular score line 120, and connecting the inner end of the score line 113 with the score line 107, there is an irregular score line 121. Extending from the inner end of the score line 107 to the edge 122 of the blank, there is an irregular score line 123, and extending from the inner end of the score line 109 to the edge 124 of the blank, there is an irregular score line 125.

The extension 92 is provided on its edge 126 with a tongue 127 which, when the blank is set up, interlocks with a tongue 128 on the edge 129 of the extension 96. The extension 93 is provided on its edge 130 with a tongue 131 which, when the blank is set up, interlocks with a tongue 132 on the edge 133 of the extension 97.

Extending across the blank near the right hand end thereof in Figure 20, there is a score line 134, which score line starts at the base of the edge 106 of the extension 93, and extends across the extension 97, and extending across the blank from the base of the edge 102 of the extension 92 and extending through the extension 96 there is a score line 135. The score lines 134 and 135, it will be noted by examination of Figure 20 of the drawings, extend from the inner ends respectively of the score lines 107 and 103.

To form the blank above described into a container or box, the blank is folded upon the score lines 134 and 135 in such a manner that the end designated 136, will overlap the inwardly turned end 137 of the blank. The blank is secured in this folded position by suitable adhesive applied to the overlapping portions and after the adhesive has set, the folded blank is, by means of pressure applied to the sides thereof, forced into substantially cylindrical form. The extensions 92, 106, 96, and 97 are next folded inwardly and their respective tongues interlocked, after which the extensions 91 and 95 are folded inwardly to completely close the ends of the container or box, it being understood that the flaps 140 and 141 of the extensions 91 and 95, respectively, are tucked within the side walls of the box. With the blank folded and formed as described, slight pressure upon the sides of the carton or box will cause the same to flex or fold upon the several score lines described, and assume the form or shape illustrated in Figures 8 to 10, inclusive.

That form of the invention illustrated in Figures 11 and 12 is constructed from the blank illustrated in Figure 21, and I will now proceed to describe this blank and the method in which it is shaped and scored.

The main body portion of the blank is rectangular in form and is designated 150. At its right hand end in Figure 1, it is formed with two extensions 151 and 152, and closely adjacent these extensions 151 and 152 there are two extensions 153 and 154, respectively. The extension 153 is separated from the extension 151 by a line of cut 155, the extension 154 being separated from the extension 152 by a line of cut 156. The right hand end of the blank in Figure 21 is formed with a curved portion, the end edge of the blank being straight as at 157, which merges at 158 into a curved portion 159, which latter merges at 160 into a straight edge again at 161. The blank is scored along a line 162 to form the extension 151 and along a line 163 to form the extension 152. The score line 162 is in line with its respective side edge of the blank body and terminates at the edge 164 of the extension 153. The score line 163 is in line with its respective side edge of the blank and terminates at the edge 165 of the extension 154. By this arrangement the score lines 162 and 163 also form the extensions 153 and 154, respectively. Adjacent the left hand end of the blank in Figure 21, but slightly spaced therefrom, there are two extensions 166 and 167 formed by scoring the blank at 168 and 169 in line with the side edges of the body portion thereof.

Extending transversely of the blank and starting at the score line 162 and terminating at the score line 163 there is a score line 170, which has a curved portion 171 between its ends. Extending transversely of the blank from the score line 162 to the score line 163, there is a score line 172 which is of the same conformation as the score line 170 and is arranged in opposed relation thereto. Extending transversely of the blank adjacent the left hand end thereof in Figure 1, there are two score lines 173 and 174, which are of substantially the same conformation as the score lines 170 and 172 and are opposed to each other, the score line 173 being opposed to the score line 172.

The reference numeral 175 designates a score line which extends throughout the width of the body portion of the blank and also throughout the two extensions 153 and 154. The reference numeral 176 designates a score line which extends throughout the width of the body portion of the blank and also throughout the width of the extensions 166 and 167.

I will now describe the manner in which the container or box is formed from the blank illustrated in Figure 21.

The blank is first flexed or folded about the score lines 175 and 176 in such a manner that the right hand end of the blank in Figure 21 will overlap a portion of the left hand end thereof when it is folded inwardly upon the score line 176. With the parts in this position, the overlapped portions are secured together by a suitable adhesive. After the adhesive has set, the container is partially set up by exerting pressure upon the sides thereof, after which the extensions 153 and 166 on one end and the extensions 154 and 167 upon the opposite end are turned inwardly of the box. After this has been done, the extensions 151 and 152 are folded over the inwardly folded extensions 153, 166, 154, and 167 and their end flaps 177 and 178 respectively, which are formed respectively by the score lines 179 and 180, are tucked inwardly of the container or box. If now, pressure be applied to the several sides of the box, the same will assume the form in which it is illustrated in Figures 11 and 12.

That form of the invention illustrated in Figures 13 to 15, inclusive, is formed from the blank illustrated in Figure 22, which will now be described. The body portion of the blank in Figure 22 is designated 200. At the left hand end in said figure, it has two extensions 201 and 202. The extension 201 is formed with a plurality of flap extensions 203 which are spaced by a flap extension 204, these flap extensions being formed by score lines 208 and 209, respectively. The extension 202 has closing flaps 205 which are spaced by means of a closing flap 206 and which are formed respectively by score lines 210 and 211. Projecting from the left hand end of the blank in said figure there is an extension 207. Closely adjacent the extension 201 there is an extension 212, and upon the opposite side of the blank closely adjacent the extension 202 there is an extension 213. At the opposite end of the blank but slightly spaced therefrom there is an extension 214 on one side of the blank and upon the opposite side of the blank there is an extension 215.

The extension 201 is formed by scoring the blank at 216, the extension 202 being formed by scoring the blank at 217. The extension 212 is formed by scoring the blank at 218, the extension 213 being formed by scoring the blank as at 219. The extension 214 is formed by scoring the blank as at 220 and the extension 215 is formed by scoring the blank as at 221.

Extending inwardly of the blank from the ends of the score lines 216 there are two score lines 222 and 223, and extending from the inner ends of these score lines there are two angularly disposed score lines 224 and 225 respectively, which merge into a score line 226, which terminates short of the score line 217, but is connected thereto by two angularly disposed score lines 227 and 228. Connecting the inner ends of the score lines 222 and 223, there is a score line 229. Extending inwardly of the blank from the ends of the score line 218, there are two score lines 230 and 231, the inner ends of which are connected by means of angularly disposed score lines 232 and 233 with a score line 234, which extends throughout the extension 212, the body portion 200 of the blank and the extension 213. Extending from this score line 234 there are two angularly disposed score lines 235 and 236 which terminate at the ends of the score line 219. The score lines 230 and 231 are connected by a score line 237.

Extending inwardly of the blank in spaced relation to each other there are two score lines 238 and 239, and extending from the inner ends of these score lines there are two angularly disposed score lines 240 and 241, respectively. The angularly disposed score lines 240 and 241 merge into a score line 242 which terminates short of the adjacent side edge of the blank but is connected thereto by angularly disposed score lines 243 and 244. The inner ends of the score lines 238 and 239 are connected by means of a score line 245.

Extending inwardly from one side edge of the blank 200 in spaced relation to each other, there are two score lines 246 and 247. Extending from the inner ends of these score lines there are two angularly disposed score lines 248 and 249 which merge into a score line 250, which extends throughout the width of the blank and the extensions 214 and 215. Leading from the score line 250 there are two angularly disposed score lines 251 and 252 which extend to the ends of the score line 221. The inner ends of the score lines 246 and 247 are connected by a score line 253.

In folding this blank to form the box or container illustrated in Figures 13 to 15, the right hand end of the blank is folded inwardly upon the score line 250, the left hand end of the blank being folded inwardly into overlapped relation with the inwardly folded end heretofore mentioned by flexing or folding upon the score line 234. The overlapped ends are secured together by suitable adhesive, and after the same has set, pressure upon the two opposite ends of the thus folded blank will cause the same to assume a substantially cylindrical form. After this has been done, the extensions 212 and 214 are folded inwardly into overlapped relation as are the extensions 213 and 215, after which the extensions 201 and 202 which form the closing flaps of the box are folded inwardly over their inwardly folded extensions with their extension closing flaps tucked within the box. If now, pressure be applied to the sides of the box, the same will flex about the several score lines to form the box or container shown in Figures 13 to 15.

That form of the invention illustrated in Figures 16 to 19 of the drawings is constructed from the blank shown in Figure 23, and I will now describe the manner in which said blank is manipulated to form the same.

The main body portion of the blank is designated 270, and said blank is scored throughout its length by score lines 271 and 272, which extend parallel to the side edges of the blank in spaced relation therewith. Upon its right hand end in Figure 23, the blank has two extensions 273 and 274 which project laterally from the side edges thereof, and each of these extensions is scored as at 275 to provide end closing flaps 276. Adjacent the extension 273 there is an extension 277 which, however, is separated from the extension 273 by a line of cut 278, and upon its outer edge the extension 277 has a tongue 279'. Adjacent the extension 274 there is an extension 280 which, however, is separated from the extension 274 by a line of cut 281. This extension is also provided with a tongue 282, which tongue is adapted to interlock with the tongue 279, heretofore mentioned, when the blank is flexed or folded to produce the finished product.

The extensions 273 and 274 are scored respectively along the lines 283 and 284, and the extensions 277 and 280 are scored respectively along the lines 278 and 279. Extending transversely of the blank and through the extensions 277 and 280, and terminating at the base of the tongues of the said extensions, there is a score line 285.

Adjacent the opposite end of the blank, but spaced slightly therefrom, there are two extensions 286 and 287. The extension 286 has upon its outer edge a tongue 288, and said extension is also scored as at 289. The extension 287 is provided upon its outer edge with a tongue 290, and this extension is likewise scored as at 291.

Extending from the inner end of the line of cut 278, and terminating at the score line 271, there is a score line 292, and extending inwardly from the line of cut 281, there is a score line 293 which terminates at the score line 272. Extending from the inner end of the edge 294 of the extension 277, and terminating at the score line 271 there is a score line 295, and extending from the inner end of the edge 296 of the extension 280 there is a score line 297 which terminates at the score line 272.

Extending from the inner end of the edge 298 of the extension 286 there is a score line 299, and extending inwardly from the inner end of the edge 300 of the extension 287, and terminating at the score line 272, there is a score line 301.

Extending from the inner end of the edge 302 of the extension 286, and terminating at the score line 272, there is a score line 303, and extending from the inner end of the edge 304 of the extension 287, and terminating at the score line 272, there is a score line 305. Extending transversely of the blank body, and throughout the extensions 286 and 287, there is a score line 306.

The inner ends of the score lines 292 and 293 are connected by a pair of oppositely disposed arcuate or curved score lines 307 and 308. The inner ends of the score lines 295 and 297 are connected by a pair of oppositely disposed arcuate or curved lines 309 and 310. The inner ends of the score lines 299 and 301 are connected by a pair of arcuate or curved score lines 311 and 312, and the inner ends of the score lines 303 and 305 are connected by a pair of arcuate or curved score lines 313 and 314.

To provide the container shown in Figures 16 to 19, inclusive, from the blank illustrated in Figure 23, the ends of the blank are first folded inwardly of the body portion upon their respective score lines 285 and 306, with the right hand end in said figure overlying the inwardly folded left hand end, in which position the ends are secured together by a suitable adhesive which is allowed to set. After the adhesive has set, pressure is applied to the ends of the folded blank whereupon the blank assumes approximately a cylindrical form. The extensions 277 and 280 are next flexed or folded upon their respective score lines 278 and 279, and their tongues 279' and 282 are interlocked, after which the extension 274 is flexed or folded inwardly upon the score line 284 and the closing flap 276 is tucked in. If, now, the folded blank has not assumed the form shown in Figures 16 to 19, inclusive, it is only necessary to apply a slight pressure to the side walls thereof, whereupon the blank will be flexed or folded upon the several score lines to assume the form of the finished carton or box.

In Figures 24 to 30 I have illustrated still another form of carton or container which I am able to construct by practicing the present invention. This last mentioned form of the invention differs from the other forms hereinbefore described in that one of its ends is of larger dimensions transversely than is the other end.

The blank from which this last mentioned form is constructed is illustrated in Figure 30, and it comprises a main body portion 350 which is, in this form of the invention, of segmental shape or form. Upon one of its side edges said blank has three extensions 351, 352, and 353, the extension 351 being scored as at 353' to provide a closing flap 354. Upon the opposite side, the blank is provided with three extensions 355, 356, and 357, the extension 355 being scored as at 358, to provide a closing flap 359.

The extensions 351, 352, and 353 have their inner edges defined respectively by score lines 360, 361, and 362, and the extensions 355, 356, and 357 have their inner edges defined respectively by score lines 363, 364, and 365.

The extension 352 is separated from the extension 351 by a line of cut 366, the extension 356 being separated from the extension 355 by a line of cut 367.

Extending longitudinally of the blank and arranged in end to end angular relation, there is a plurality of straight score lines 368, 369, 370, and 371, the latter terminating at one end at the end edge of the blank as at 372. Also extending longitudinally of the blank and arranged in end to end angular relation and in spaced relation with the score lines 368 to 371, there is a plurality of score lines 373, 374, 375, and 376, and extending from the outer end of the score line 376 to a point at 377, upon the end edge of the blank, there is a relatively short score line 378.

Extending from that point where the adjacent ends of the score lines 368 and 369 meet to the ends of the score line 373, there are two angularly disposed score lines 379 and 380. Extending from that point where the two adjacent ends of the score lines 369 and 370 meet to the opposite ends of the score line 374, there are two angularly disposed score lines 381 and 382. Extending from that point where the two adjacent ends of the score lines 370 and 371 meet, and extending to the opposite ends of the score line 375, there are two angularly disposed score lines 383 and 384. Extending from the opposite ends of the score line 376 and meeting at the point 385 on the score line 371, there are two angularly disposed score lines 386 and 387.

Extending from the inner end of the edge 388 of the extension 353 transversely of the blank body and terminating at the edge 389 of the extension 357, there is a score line 390, and extending transversely of the blank from the inner end of the line of cut 366 and terminating at the point where the adjacent ends of the score lines 368 and 369 join, there is a score line 391.

Extending from the inner end of the edge 392 of the extension 352 and terminating at the outer edge 393 of the extension 356, there is a score line 394. Extending from the inner end of the edge 395 of the extension 353 and terminating at the point where the adjacent ends of the score lines 370 and 371 meet, there is a score line 396.

The container or box illustrated in Figures 24 to 29, inclusive, is formed from the blank shown in Figure 30 in the following manner.

That portion of the blank which lies to the left of the score line 390 in Figure 30 is folded inwardly of the blank on the score line 390. That portion of the blank which lies to the right of the score line 394 in said Figure 30, is folded inwardly of the blank body upon the score line 394 and positioned in overlapped relation with the afore-mentioned inwardly folded portion. These overlapped portions are secured together with a suitable adhesive which is permitted to set. The adhesive having set, the ends are next closed. This is accomplished by exerting slight pressure upon the sides of the folded blank and flexing it into substantially cylindrical form and folding in the several extensions 351, 352, 353, 355, 356, and 357, after which the flaps 354 and 359 are tucked inwardly of the container or box.

If now, the container or box has not assumed the shape illustrated in Figures 24 to 28, inclusive, slight pressure upon the sides thereof will cause a flexing of the blank upon its several score lines and cause it to assume the form illustrated.

By examination of the accompanying drawings, it will be apparent that in each illustrated form of the invention the score lines, where they depart from the straight or regular and become irregular, are so arranged as to be in pairs with the score lines in each pair opposed to each other. I have found that by employing this method of scoring that two irregular lines of fold are provided which bear a definite relation to each other and that any bulging or distortion caused by flexing or folding along one irregular line of fold is compensated for by the bulging or distortion caused by flexing or folding along the opposed irregular line of fold.

Such a construction causes the blank when folded along the several score lines to assume a shape in which its side walls consist of panels positioned in angularly related planes and thus I am able to produce folded blank boxes in unique shapes and forms which have heretofore been considered impossible of attainment in the folded blank box art.

In that form of container or box which I have illustrated in Figures 1 to 8, inclusive, of the drawings, it will be noted that I have illustrated a series of curved lines 500 which connect the ends of the arcuate score lines 48. These lines 500 do not constitute lines of flexing or fold and may be entirely dispensed with. In the present instance, they are employed solely to produce the effect of circular areas upon the side walls of the box, the side walls in reality assuming the profile illustrated by the score line 88 in Figure 1.

From the foregoing it will be readily apparent that I have devised a new and novel method of scoring and flexing material whereby I am enabled by what I term compensated irregular scoring to form folded blank boxes in unique shapes and designs as distinguished from folded blank boxes as commonly constructed in which the boxes formed consist merely of true rectangular or cylindrical shapes.

While I have herein illustrated several different types of boxes in which the principle of irregular compensated scoring is employed, it is to be understood that containers or boxes other than those herein shown may be constructed and that the invention is not therefore to be limited to the designs herein shown.

Having thus described the invention, what is claimed is:

1. A container formed from foldable material, the walls thereof when the container is set up, comprising alternate concaved and convex panels, irregular score lines defining the marginal edges of said concaved and convex panels and serving the connection between the panels, said irregular score lines being arranged in pairs in opposed relation whereby setting up of the box produces the aforementioned concave and convex panels and produces tension therein.

2. A container formed from foldable material, the walls thereof when the container is set up, comprising alternately concaved and convex panels, irregular score lines defining the edges of said panels and forming the connecting means therebetween, said score lines being arranged in pairs with the irregular portions in each score line being opposed with respect to the corresponding portion in the other score line of the pair of score lines.

3. A container formed from foldable material, said container having side walls consisting of alternately flexed areas, irregular score lines defining the side walls of the container, said score lines being of like character but having their irregular portions opposed to each other whereby the container when set up, folds on said score lines to produce the concaved and convex areas and tension in the side walls of the container.

4. A blank for a box having a body portion providing for the side walls of the resulting box, extensions connected at the top and bottom of the blank, providing for the top and its associated end flaps and the bottom and its associated end flaps respectively having one of its lateral edges rectilinear, the body of the blank being scored or creased by sets of mutually serially related scored or creased lines the lines of each set extending at an angle respectively to one another, to provide when set-up side walls of the box related to one another at angles other than right angles and at angles other than right angles to the top and bottom.

RICHARD EATON PAIGE.